Oct. 31, 1967  P. D. JONES  3,350,607
CATHODE LOADED OVERLOAD PROTECTION CIRCUIT
Filed March 15, 1965

# United States Patent Office 3,350,607
Patented Oct. 31, 1967

3,350,607
CATHODE LOADED OVERLOAD
PROTECTION CIRCUIT
Peter David Jones, Birmingham, England, assignor to Joseph Lucas (Industries) Limited, Birmingham, England
Filed Mar. 15, 1965, Ser. No. 439,814
Claims priority, application Great Britain, Apr. 22, 1964, 16,626/64
8 Claims. (Cl. 317—33)

ABSTRACT OF THE DISCLOSURE

In a D.C. overload protection circuit a semi-conductor controller rectifier is used which can be turned off by negative pulses applied to its gate as well as being turned on by positive pulses applied to its gate. The controlled rectifier is connected across a D.C. source with a controlled rectifier and a load in series with its cathode in that order, and the gate of the controlled rectifier is connected to a point intermediate the resistor and load either permanently or when the controlled rectifier is conducting. In use, excessive current flow in the load takes the potential at the junction of the load and resistor to such a negative value that the controlled rectifier is turned off.

---

This invention relates to D.C. overload protection circuits, and is a modification of the invention described and claimed in Patent No. 3,195,033. As in Patent No. 3,195,033, use is made in the present case of a semi-conductor device which will herein be termed a switchable rectifier. This device has the properties of a semi-conductor controlled rectifier, but in addition can be switched off by a negative pulse applied between its gate and cathode.

A circuit according to the invention comprises in combination first and second terminals for connection to a D.C. source so as to be of positive and negative polarity respectively, a switchable rectifier having its anode connected to the first terminal and its cathode connected to the second terminal through a first resistor in series with a load to be protected, means for applying pulses between the gate and cathode of the switchable rectifier to switch it on, and means connecting the gate of the switchable rectifier to a point intermediate the first resistor and load either permanently or when the switchable rectifier is conducting, the arrangement being such that when the switchable rectifier is conducting its gate will be at a negative potential relative to its cathode but this potential will be insufficient to switch off the switchable rectifier unless the current flowing in the load exceeds a predetermined value.

Figure 1:
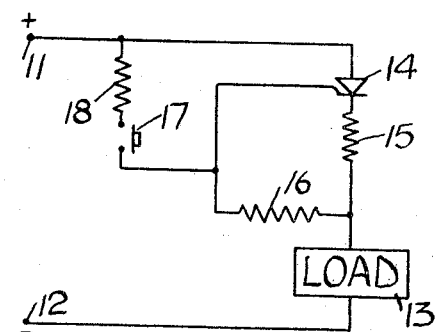
Figure 2:
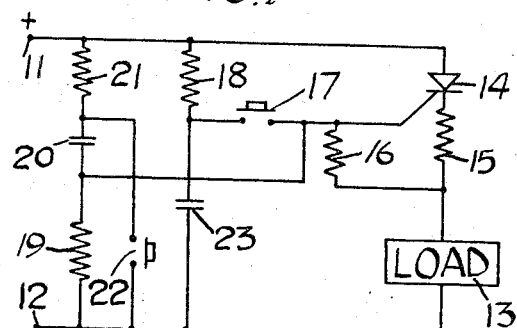
Figure 3:
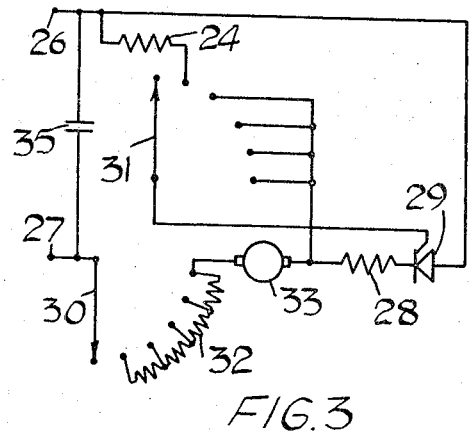

In the accompanying drawings, FIGURES 1 to 3 are circuit diagrams corresponding to FIGURES 1 to 3 of Patent No. 3,195,033, but modified in accordance with the present invention. The reference numerals used in the drawings are equivalent to those used in Patent No. 3,195,033.

Referring to FIGURE 1, there are provided first and second terminals 11, 12 which in use are connected to a D.C. source so as to be positive and negative in polarity respectively. The terminal 11 is connected to the anode of a switchable rectifier 14, the cathode of which is connected to the terminal 12 through a resistor 15 and a load 13 in series. The gate of the rectifier 14 is connected through a resistor 16 to a point intermediate the resistor 15 and load 13, and is further connected through a switch 17 and a resistor 18 in series to the terminal 11.

In operation, when the switch 17 is closed positive current flows from the gate to the cathode of the rectifier 14 and switches it on. Current now flows in the load 13, and the switch 17 is re-opened. While current flows in the load 13, the cathode of the rectifier 14 is at the potential of the terminal 11, but its gate is at a potential slightly negative with respect to the cathode. However, if current flowing in the load 13 increases, the negative voltage between the gate and cathode increases. The arrangement is such that when a predetermined current flows in the load, sufficient negative current flows between the gate and the cathode of the rectifier 14 to switch it off.

In the modification shown in FIGURE 2, a point intermediate the switch 17 and resistor 18 is connected to the terminal 12 through a capacitor 23, and the terminals 11, 12 are bridged by a resistor 21, capacitor 20 and resistor 19 in series. A point intermediate the capacitor 20 and resistor 19 is connected to the gate of the rectifier 14, and the capacitor 20 and resistor 19 are bridged by a second switch 22.

In this example the capacitor 23 normally charges through the resistor 18, and when the switch 17 is closed, the capacitor 23 discharges through the gate and cathode of the rectifier 14 to switch it on. The rectifier is switched off in the event of a predetermined current in the load 13 being exceeded in the same way as in FIGURE 1. However, the rectifier 14 can also be switched off by closing the switch 22. Normally, the capacitor 20 charges through the resistors 21, 19, and when the switch 22 is closed the upper plate of the capacitor 20 is connected to the terminal 12. The lower plate therefore becomes highly negative, and a negative current flows from the gate to the cathode of the rectifier 14 to switch it off.

Referring now to FIGURE 3, there are provided terminals 26, 27 which are connected to a D.C. source in use so as to be of positive and negative potential respectively. There is further provided a pair of wipers 30, 31 which are movable in synchronism over two sets of contact pieces respectively, the first contact piece in each set being electrically isolated from the remainder of the circuit. The wiper 30 is connected to the terminal 27, and the remaining contact pieces in the first set are connected to points on a resistor 32 which is connected through a motor armature 33 and a resistor 28 in series to the cathode of a switchable rectifier 29, the anode of which is connected to the terminal 26. The wiper 31 is connected to the gate of the switchable retcifier 29, and the second contact piece in the set over which the wiper moves is connected to the terminal 26 through a resistor 24. The remaining contact pieces over which the wiper 31 moves are connected to a point intermediate the resistor 28 and armature 33. A capacitor 35 is connected between the terminals 26, 27.

In operation, when the wipers 30, 31 are moved onto the second contact pieces, the gate of the rectifier 29 is connected to the terminal 26, and so the rectifier 29 is switched on. The motor is energised through the entire resistor 32. When the wipers 30, 31 are moved onto their remaining contact pieces, successive portions of the resistor 32 are removed from the circuit, and the gate of the rectifier 29 is permanently connected to a point intermediate the resistor 28 and armature 33. The circuit now operates in exactly the same way as the circuit shown in FIGURE 1, the gate of the rectifier 29 becoming sufficiently negative to switch the rectifier 29 off in the event of an excessive current flowing in the armature 33. The capacitor 35 prevents switching off of the rectifier 29 as a result of momentary interruption in the supply to the terminals 26, 27. However, if the supply fails completely the rectifier 21 will switch off and the motor will not start again when the supply is resumed until the wipers 30, 31 are returned to their respective second contact pieces. This ensures that the motor is restarted correctly with the full resistor 32 in the circuit.

It will be appreciated that the positions of the load and cathode resistor could be reversed in the example described.

Having thus described my invention what I claim as new and desire to secure by Letters Patent is:

1. A D.C. overload protection circuit comprising in combination first and second terminals for connection to a D.C. source so as to be of positive and negative polarity respectively, a switchable rectifier having its anode connected to the first terminal and its cathode connected to the second terminal through a first resistor in series with a load to be protected, means for applying positive pulses between the gate and cathode of the switchable rectifier to switch it on, and means connecting the gate of the switchable rectifier to a point intermediate the first resistor and load either permanently or when the switchable rectifier is conducting, the arrangement being such that when the switchable rectifier is conducting its gate will be at a negative potential relative to its cathode but this potential will be insufficient to switch off the switchable rectifier unless the current flowing in the load exceeds a predetermined value.

2. A circuit as claimed in claim 1, including a wiper connected to the second terminal and movable over a second resistor one end of which is connected to the cathode of the switchable rectifier through the armature of a motor and said first resistor in series, said second resistor and armature constituting the load, and the arrangement being such that as the wiper moves over the second resistor, it varies the proportion of the second resistor in circuit with said armature.

3. A circuit as claimed in claim 2, including a second wiper operable in synchronism with the first wiper, the arrangement being such that initial movement of the wipers completes a circuit from the gate of the switchable rectifier through the second wiper and a resistor in series to the first terminal, thereby switching on the switchable rectifier, further movement of the wipers serving to reduce the proportion of said second resistor in series with the armature of the motor, and to move the second wiper to a position in which it connects the gate of the switchable rectifier to a point intermediate the first resistor and armature.

4. A circuit as claimed in claim 3, including a capacitor connected between the first and second terminals.

5. A circuit as claimed in claim 1 in which the gate is permanently connected to the point intermediate the first resistor and load through a resistor.

6. A circuit as claimed in claim 5 in which the means for applying triggering pulses to the gate comprises a normally open switch and a resistor connected in series between the gate and the first terminal.

7. A circuit as claimed in claim 6 in which a point intermediate the switch and resistor is connected to the second terminal through a capacitor the discharge of which when the switch is closed serves to switch on the switchable rectifier.

8. A circuit as claimed in claim 5, including switch-operable means for switching off the switchable rectifier.

References Cited

UNITED STATES PATENTS 3,195,033    7/1965    Jones _____ 307—88.5 X

MILTON O. HIRSHFIELD, *Primary Examiner.*

J. D. TRAMMELL, *Assistant Examiner.*